(12) United States Patent
Adamek et al.

(10) Patent No.: US 9,520,903 B2
(45) Date of Patent: Dec. 13, 2016

(54) INTERCONNECTION FABRIC WITH PROTOCOL AGNOSTIC SWITCH FOR FLEXIBLE RADIO AVIONICS

(71) Applicant: Honeywell International Inc., Morristown, NJ (US)

(72) Inventors: Karel Adamek, Brno (CZ); Petr Kanovsky, Tupesy (CZ); Radek Zaruba, Decin (CZ); Martin Mlaskac, Kanice (CZ)

(73) Assignee: Honeywell International Inc., Morris Plains, NJ (US)

( * ) Notice: Subject to any disclaimer, the term of this patent is extended or adjusted under 35 U.S.C. 154(b) by 231 days.

(21) Appl. No.: 14/282,634

(22) Filed: May 20, 2014

(65) Prior Publication Data

US 2015/0341057 A1    Nov. 26, 2015

(51) Int. Cl.
| | | |
|---|---|---|
| H04B 1/00 | (2006.01) | |
| H04B 10/2575 | (2013.01) | |
| H04B 7/185 | (2006.01) | |
| H04L 12/58 | (2006.01) | |
| H04B 7/06 | (2006.01) | |

(52) U.S. Cl.
CPC ........ *H04B 1/0003* (2013.01); *H04B 7/18506* (2013.01); *H04B 10/25752* (2013.01); *H04B 7/0602* (2013.01); *H04L 51/046* (2013.01)

(58) Field of Classification Search
CPC ... H04B 7/0602; H04B 1/0003; H04L 51/046; H04L 51/32
See application file for complete search history.

(56) References Cited

U.S. PATENT DOCUMENTS

| | | | |
|---|---|---|---|
| 6,072,994 A | 6/2000 | Phillips et al. | |
| 7,136,643 B2 | 11/2006 | Campbell | |
| 7,428,208 B2 | 9/2008 | Jones et al. | |
| 7,620,127 B1 | 11/2009 | Koenck et al. | |

(Continued)

FOREIGN PATENT DOCUMENTS

| | | |
|---|---|---|
| EP | 1193888 | 4/2002 |
| EP | 2216909 | 8/2010 |

(Continued)

OTHER PUBLICATIONS

European Patent Office, "Extended European Search Report from EP Application No. 15165540.4 mailed Oct. 16, 2015", from Foreign Counterpart of U.S. Appl. No. 14/282,634, Oct. 16, 2015, pp. 1-7, Published in: EP.

(Continued)

*Primary Examiner* — Raj Jain
(74) *Attorney, Agent, or Firm* — Fogg & Powers LLC (57) ABSTRACT

A radio system comprises a plurality of software defined radio units, and a plurality of digital data switches each in operative communication with at least one of the radio units, with the digital data switches operatively connected to each other. A plurality of antenna units are each in operative communication with at least one of the radio units through at least one of the digital data switches. A plurality of radio resources managers are each operatively coupled to one or more of the digital data switches, with each of the radio resources managers configured to control one or more of the digital data switches to route digital data between the radio units and the antenna units.

15 Claims, 3 Drawing Sheets

(56) References Cited

U.S. PATENT DOCUMENTS

| | | | |
|---|---|---|---|
| 7,761,069 | B1 | 7/2010 | Studenberg, Jr. et al. |
| 7,831,255 | B1 | 11/2010 | Gribble et al. |
| 8,344,935 | B1 | 1/2013 | Hoffmann et al. |
| 2002/0126685 | A1 | 9/2002 | Leatherbury et al. |
| 2009/0232507 | A1* | 9/2009 | Gupta ................ H04L 27/2096 398/115 |
| 2010/0080236 | A1 | 4/2010 | Shawbaki |
| 2010/0202577 | A1 | 8/2010 | Whetsel |
| 2011/0065446 | A1* | 3/2011 | Mueck ................ H04W 72/082 455/452.2 |
| 2012/0295537 | A1* | 11/2012 | Zaruba ............... H04B 7/18506 455/12.1 |
| 2013/0190948 | A1* | 7/2013 | Baddoo ............. B64D 11/0015 701/3 |
| 2014/0241157 | A1* | 8/2014 | Tan ...................... H04J 3/0638 370/235 |
| 2015/0341057 | A1* | 11/2015 | Adamek ............. H04B 1/0003 370/384 |

FOREIGN PATENT DOCUMENTS

| | | |
|---|---|---|
| EP | 2544383 | 1/2013 |
| GB | 2477960 | 8/2011 |

OTHER PUBLICATIONS

Kanovsky et al., "Radio Resource Management Methods and Systems", U.S. Appl. No. 14/253,536, filed Apr. 15, 2014, pp. 1-31, Published in: US.

* cited by examiner

INTERCONNECTION FABRIC WITH PROTOCOL AGNOSTIC SWITCH FOR FLEXIBLE RADIO AVIONICS

BACKGROUND

Over the next several years, the aeronautical communication infrastructure will evolve as a result of two major ongoing Air Traffic Management (ATM) modernization programs. These include the Single European Sky ATM Research (SESAR) program in Europe and the Next Generation Air Transportation System (NextGen) in the United States. Despite their differences, both of these programs assume that future ATM will diverge from voice communication and will heavily rely on air/air and air/ground data exchanges.

Already before SESAR and NextGen, the joint Eurocontrol and Federal Aviation Administration (FAA) program "Action Plan 17" (AP17) identified a possible need for up to three new communication technologies primarily supporting Air Traffic Control (ATC) and Airline Operational Center (AOC) services. These new communication technologies include the airport local communication system such as the Aeronautical Mobile Aircraft Communication System (AeroMACS), new terrestrial line-of-sight communication systems such as the L-band Digital Aeronautical Communication System (L-DACS), and a new satellite communication (SatCom) system. Only AeroMACS is currently being pursued by both Europe and the U.S. The L-DACS and new SatCom system are being developed in Europe within the SESAR program and the European Space Agency (ESA) program Iris. On the contrary, the FAA and NextGen currently rely on upgrades of the existing very high frequency (VHF) datalink technologies. This implies that if the European programs are successful and the U.S. maintains the current approach based on legacy systems, future aircraft flying from SESAR to NextGen airspace will need to be equipped with a set of communication avionics compliant with two different sets of requirements.

Furthermore, even if the SESAR solution is adopted in other parts of the world and aligned with NextGen, there will always be many regions where the required modernization of the ATM infrastructure will not be affordable and where only the legacy voice communication system will be used for many years. As such, most likely there will be a very long transition period, when many exemptions may be provided to existing aircraft equipped with legacy avionics.

A promising technology for this future environment is the flexible avionics radio architecture based on distributed Software Defined Radio (SDR) principles. While many of the state-of-the-art radios employ SDR technology, there is still a need for concrete solutions related to the interconnection fabric employed in SDR systems to provide the flexibility and redundancy needed for aircraft communication systems.

SUMMARY

A radio system comprises a plurality of software defined radio units, and a plurality of digital data switches each in operative communication with at least one of the radio units, with the digital data switches operatively connected to each other. A plurality of antenna units are each in operative communication with at least one of the radio units through at least one of the digital data switches. A plurality of radio resources managers are each operatively coupled to one or more of the digital data switches, with each of the radio resources managers configured to control one or more of the digital data switches to route digital data between the radio units and the antenna units.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An interconnection fabric architecture that employs protocol agnostic switching for digital data is provided for a flexible avionics radio system. The radio system is based on a distributed software defined radio (SDR) architecture that includes multiple general purpose digital signal processing platforms (referred to hereafter as "radio units"), which are respectively connected to waveform specific or waveform independent radio frontends (referred to hereafter as "antenna units").

Digital data switches employed in the radio system are "protocol agnostic" in that the switching is controllable independently of the actual data and protocol being transferred in the radio system. The digital data switches have at least two connections to other units such as other switches, radio units, or antenna units. In addition, one or more of the digital data switches can exist as a standalone component, or can be integrated with the other radio system components.

The interconnection between each radio unit and a respective antenna unit includes a high speed digital data bus, which allows reliable and deterministic transfer of signal samples and control information between the radio unit and antenna unit. Furthermore, the interconnections between the radio units and antenna units are reconfigurable through multiple digital data switches so that different radio units can be connected to different antenna units depending on actual configuration of the individual units. The reconfigurable interconnections provide increased system level reliability since signals can be easily rerouted to bypass faulty elements in the radio system.

In one embodiment, a protocol agnostic digital data switch is located inside each radio unit. The switches are mutually interconnected among the radio units to enable the interconnection reconfiguration. Alternatively, the switches can be located outside of the radio units. In addition, as the digital switching in the radio system is done at the physical layer common for all waveforms, an optimized and maximally simple protocol can be defined for each waveform. This allows for easier porting of legacy protocols from existing radios used for communication between radio frequency (RF) and digital modules within one box or on a single board.

The interconnections can be either local (e.g., radio unit and antenna unit both in an avionics bay) or remote if aircraft installation constraints allow (e.g., antenna unit placed close by an antenna to reduce coaxial cabling length and weight). For example, when a remote antenna unit is located by the antenna, the replacement of coaxial RF cables by digital interconnection (optics) minimizes the RF losses and thus reduces the required High Power Amplifier (HPA) output power. The minimized variance of the losses also relaxes the requirements on automatic gain control.

The interconnection fabric architecture is reliable, deterministic, and flexible, and thus well suitable for future avionic radios development and certification. For example, this architecture is applicable to future Communication, Navigation and Surveillance (CNS) avionics radios based on distributed SDR architectures. The present interconnection approach can also meet strict requirements for data throughput, latency and network determinism in avionics systems.

Exemplary embodiments of the present invention are described hereafter with reference to the drawings.

Figure 1:
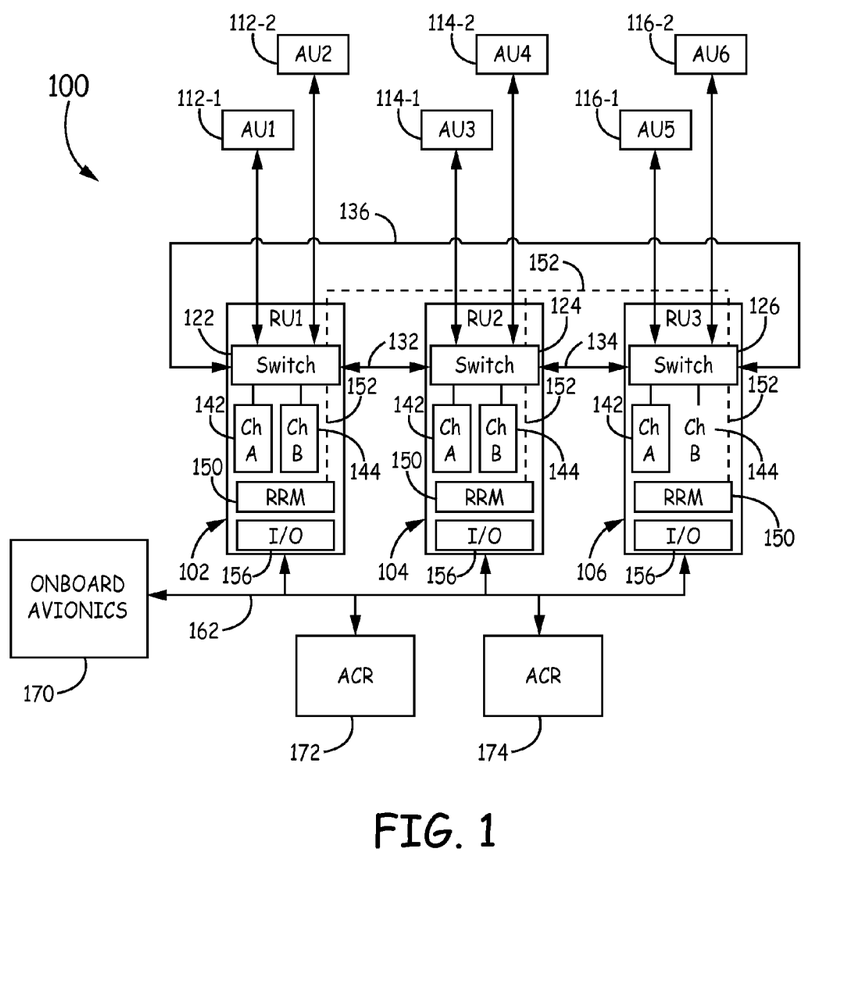
FIG. 1 is a block diagram of an interconnection fabric architecture for a flexible avionics radio system according to one embodiment.

FIG. 1 illustrates an interconnection fabric architecture for a flexible avionics radio system 100 according to one embodiment. The radio system 100 generally includes a plurality of software defined radio units (labeled RU1-RU3), which are interconnected with a plurality of antenna units (labeled AU1-AU6) through a protocol agnostic digital data switch in each of the radio units that is controllable to route data between the radio units and the antenna units.

The radio system 100 is configurable to process radio signals in accordance with different communication protocols, such as one or more of VHF, very high frequency data link (VDL), high frequency (HF), high frequency data link (HFDL), or Satcom protocols, as well as future protocols such AeroMACS and L-DACS.

In the exemplary embodiment shown in FIG. 1, radio system 100 includes a first radio unit 102 (RU1) that is operatively coupled to a first antenna unit 112-1 and a second antenna unit 112-2 (AU1 and AU2) through a digital data switch 122 located in radio unit 102. A second radio unit 104 (RU2) is operatively coupled to a third antenna unit 114-1 and a fourth antenna unit 114-2 (AU3 and AU4) through a digital data switch 124 located in radio unit 104. A third radio unit 106 (RU3) is operatively coupled to a fifth antenna unit 116-1 and a sixth antenna unit 116-2 (AU5 and AU6), through a digital data switch 126 located in radio unit 106.

As shown in FIG. 1, each antenna unit has a single connection to a single switch. For example, antenna units 112-1 and 112-2 each have a single connection to switch 122 such as through separate connection cables. This provides for a reduction in weight and complexity of radio system 100, while increasing reliability. By having a single connection to a given antenna unit, antenna unit design is simplified as there is no need for complicated switching protocols or a dedicated control bus. The antenna units generally include elements commonly associated with data signal transmission and reception, such as amplifiers, filters, circulators, modulators, and the like, for broadcasting or receiving data signals via one or more antennas.

Although the antenna units are shown as separated from the radio units in FIG. 1, in other embodiments one or more of the antenna units can be integrated with a respective radio unit such that the components of the antenna units and radio unit are in a single location such as an avionics bay. For example, one or both of antenna units 112-1 and 112-2 can be integrated into radio unit 102, one or both of antenna units 114-1 and 114-2 can be integrated into radio unit 104, and one or both of antenna units 116-1 and 116-2 can be integrated into radio unit 102.

The switches 122, 124, and 126 are in bidirectional communication with each other, such as through data lines comprising metal wiring or fiber optic cables. For example, a first data line 132 provides bidirectional communication between switch 122 and switch 124. A second data line 134 provides bidirectional communication between switch 124 and switch 126. A third data line 136 provides bidirectional communication between switch 122 and switch 126. The switches are configured to work directly at the physical layer, with no higher layer packets processing.

The digital data switches 122, 124, and 126 are each connected to at least two waveform processing channel blocks 142 and 144 (Ch A and Ch B) in each of the radio units, and establish a data connection between the channel blocks and the antenna units. The channel blocks can be configured to process any avionics waveform (e.g., communication navigation surveillance system). In addition, the channel blocks can be configured to provide no waveform, one waveform, or multiple waveforms simultaneously.

The radio units 102, 104, and 106 also each include a radio resources manager (RRM) 150. The RRM 150 in each radio unit includes a processing device configured to control the operation of the switches through control lines 152. The RRM 150 is also responsible for setup and configuration of the overall architecture for radio system 100.

An exemplary radio resources manager is described in copending U.S. application Ser. No. 14/253,536, entitled RADIO RESOURCE MANAGEMENT METHODS AND SYSTEMS, the disclosure of which is incorporated herein by reference.

As the RU-AU data stream does not contain any routing control data (such as addresses), the configuration of the switches is done through a dedicated control interface provided by RRM 150 in each radio unit. For example, switch control information is sent to switches 122, 124, and 126 by the respective RRM 150 in each radio unit. The control information from each RRM 150 should match during normal operation of radio system 100.

Each of the switches can be redundantly controlled by more than one RRM 150 to avoid a single point of failure of radio system 100. A voting or other redundancy management mechanism between RRM control channels can be provided for the switches in case of individual RRM failure when the control information from one RRM is corrupted or missing. For example, the switches can support a failure-tolerant multi-master control scheme when the radio resources management functionality is distributed among each of the radio units. In this scheme, each switch can receive control information from all radio units and select the switch setting based on a majority. In addition, the switches can have a preset fallback setting that can be activated in case of detected control system failure.

The RRM 150 in each radio unit communicates with an avionics bus 162 through an input/output (I/O) interface 156 in each radio unit. The avionics bus 162 provides a data communication pathway between the radio units and various onboard avionics devices 170, such as a global navigation satellite system (GNSS) sensor, the flight management system (FMS), an altimeter, an airspeed sensor, displays, audio systems, other radios, and the like. The avionics bus 162 is also in communication with other aircraft systems, via a first Avionics Communications Router (ACR) 172 and a second ACR 174, such as a digital datalink system including ACARS (Aircraft Communications Addressing and Reporting System) or CPDLC (controller pilot data link communications).

The digital data switches in the radio units can be implemented either electrically or optically, using commercially off the shelf (COTS) devices. Exemplary digital data switches for an electrical implementation include those based on integrated circuits. Electrical switching can also implemented using a field programmable gate array (FPGA). Optical switching can be implemented using micro-electrical-mechanical systems (MEMS) optical switches. Electro optical transceivers are used with the optical switches and can be located after the channel blocks or after the switches, depending on the switch solution.

The bidirectional communication between switches allows data from one or more of the antenna units or one or more of the radio units to be rerouted through the switches.

For example, if radio unit 102 has a failure, such that data from antenna units 112-1 or 112-2 cannot be processed by radio unit 102, the data from antenna units 112-1 or 112-2 can be rerouted by switch 122 and sent to switch 124 through data line 132 for processing by radio unit 104. Alternatively, data from antenna units 112-1 or 112-2 can be rerouted from switch 122 to switch 126 in radio unit 104 through data line 136 for processing by radio unit 106.

Similarly, if radio unit 104 has a failure, such that data from antenna units 114-1 or 114-2 cannot be processed by radio unit 104, the data from antenna units 114-1 or 114-2 can be rerouted by switch 124 and sent to switch 122 through data line 132 for processing by radio unit 102. Alternatively, data from antenna units 114-1 or 114-2 can be rerouted from switch 124 to switch 126 through data line 136 for processing by radio unit 106.

Likewise, if radio unit 106 has a failure, such that data from antenna units 116-1 or 116-2 cannot be processed by radio unit 106, the data from antenna units 116-1 and 116-2 can be rerouted by switch 126 and sent to switch 124 through data line 134 for processing by radio unit 104. Alternatively, data from antenna units 116-1 or 116-2 can be rerouted from switch 126 to switch 122 through data line 136 for processing by radio unit 102.

In a similar fashion, if there is a failure in antenna unit 112-1 or antenna unit 112-2, such that data from radio unit 102 cannot be transmitted by antenna unit 112-1 or antenna unit 112-2, the data from radio unit 102 can be rerouted by switch 122 and sent to switch 124 in radio unit 104 through data line 132 for transmission by antenna unit 114-1 or antenna unit 114-2. Alternatively, data from radio unit 102 can be rerouted by switch 122 to switch 126 in radio unit 106 through data line 136 for transmission by antenna unit 116-1 or antenna unit 116-2.

Similarly, if antenna unit 114-1 or antenna unit 114-2 have a failure, such that data from radio unit 104 cannot be transmitted by antenna unit 114-1 or antenna unit 114-2, the data from radio unit 104 can be rerouted by switch 124 and sent to switch 122 in radio unit 102 through data line 132 for transmission by antenna unit 112-1 or antenna unit 112-2. Alternatively, data from radio unit 104 can be rerouted by switch 124 to switch 126 in radio unit 106 through data line 134 for transmission by antenna unit 116-1 or antenna unit 116-2.

Likewise, if antenna unit 116-1 or antenna unit 116-2 have a failure, such that data from radio unit 106 cannot be transmitted by antenna unit 116-1 or antenna unit 116-2, the data from radio unit 106 can be rerouted by switch 126 and sent to switch 124 in radio unit 104 through data line 134 for transmission by antenna unit 114-1 or antenna unit 114-2. Alternatively, data from radio unit 104 can be rerouted by switch 126 to switch 122 in radio unit 102 through data line 136 for transmission by antenna unit 112-1 or antenna unit 112-2.

Figure 2:
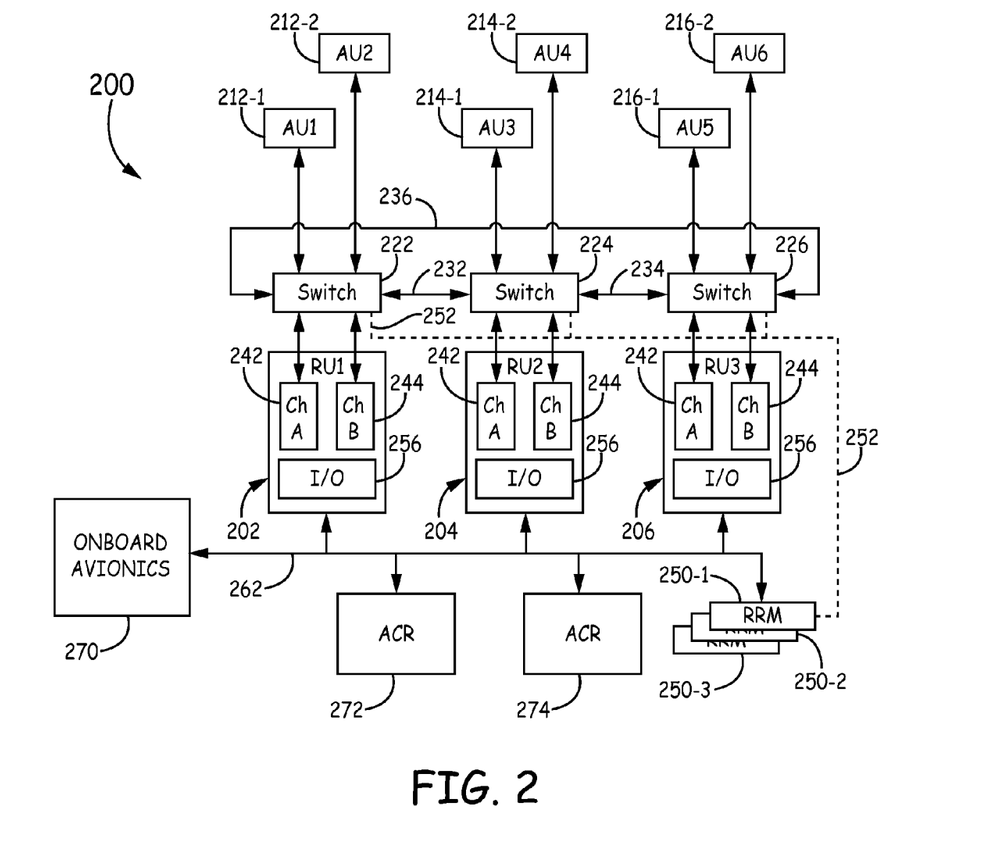
FIG. 2 is a block diagram of an interconnection fabric architecture for a flexible avionics radio system according to another embodiment.

FIG. 2 illustrates an interconnection fabric architecture for a flexible avionics radio system 200 according to another embodiment. The radio system 200 generally includes a plurality of software defined radio units (labeled RU1-RU3), which are interconnected with a plurality of antenna units (labeled AU1-AU6) through a set of protocol agnostic digital data switches, located external to the radio units, and controllable to route data between the radio units and the antenna units.

The radio system 200 is configurable to process radio signals in accordance with different communication protocols, such as one or more of VDL, HFDL, or Satcom protocols, as well as future protocols such AeroMACS.

As shown in FIG. 2, radio system 200 includes a first radio unit 202 (RU1) that is operatively coupled to a first antenna unit 212-1 and a second antenna unit 212-2 (AU1 and AU2) through a digital data switch 222 located external to radio unit 202. A second radio unit 204 (RU2) is operatively coupled to a third antenna unit 214-1 and a fourth antenna unit 214-2 (AU3 and AU4) through a digital data switch 224 located external to radio unit 204. A third radio unit 206 (RU3) is operatively coupled to a fifth antenna unit 216-1 and a sixth antenna unit 216-2 (AU5 and AU6), through a digital data switch 226 located external to radio unit 206.

As depicted in FIG. 2, each antenna unit has a single connection to a single switch. Although the antenna units are shown as separated from the radio units, in other embodiments one or more of the antenna units can be integrated with a respective radio unit such that the components of the antenna units and radio unit are in a single location such as an avionics bay.

The digital data switches 222, 224, and 226 are in bidirectional communication with each other, such as through data lines comprising metal wiring or fiber optic cables. For example, a first data line 232 provides bidirectional communication between switch 222 and switch 224. A second data line 234 provides bidirectional communication between switch 224 and switch 226. A third data line 236 provides bidirectional communication between switch 222 and switch 226.

The switches 222, 224, and 226 are each connected to at least two waveform processing channel blocks 242 and 244 (Ch A and Ch B) in the respective radio units, and establish a data connection between the channel blocks and the antenna units. The channel blocks can be configured to process any avionics waveform.

The radio system 200 also includes a set of radio resources managers (RRMs) 250-1, 250-2, and 250-3, which are located external to the radio units. The RRMs each include a processing device configured to control the operation of the switches through control lines 252. As the RU-AU data stream does not contain any routing control data, the configuration of the switches is done through a dedicated control interface provided by the RRMs. For example, switch control information can be sent to switches 222, 224, and 226 by any of the RRMs. The control information from each of the RRMs should match during normal operation of radio system 200.

Each of the switches can be redundantly controlled by the RRMs to avoid a single point of failure of radio system 200. For example, the switches can be configured to support a failure-tolerant multi-master control scheme that provides a voting mechanism that is activated when one of the RRMs has corrupted or missing control information.

Each of the radio units in radio system 200 communicate with an avionics bus 262 through an I/O interface 256 in each radio unit. The avionics bus 262 provides a data communication pathway between the radio units and various onboard avionics devices 270, such as a GNSS sensor, the FMS, an altimeter, an airspeed sensor, displays, audio systems, other radios, and the like. The avionics bus 262 is also in communication with other aircraft systems, via a first ACR 272 and a second ACR 274, such as a digital datalink system including ACARS or CPDLC.

The digital data switches in the radio units can be implemented with electrical switches or optical switches. Exemplary electrical switches include integrated circuit switches, FPGA switches, and the like. Exemplary optical switches include MEMS optical switches, and the like.

The bidirectional communication between the switches in radio system 200 allows data from one or more of the antenna units or one or more of the radio units to be rerouted through the switches in a similar fashion as discussed above for radio system 100.

The flexible avionics radio system may be embodied in other forms. For example, one or more of the digital data switches can be located in the radio units, with one or more of the radio resources managers being located external to the radio units. Alternatively, one or more of the switches can be located external to the radio units, with one or more of the radio resources managers being located in the radio units. In addition, the switches can be operatively connected to each other through various topologies, such as ring, star, line, tree, or mesh topologies, or can be fully connected to each other.

In various embodiments, one or more of the digital data switches can be connected to no waveform processing channels in a radio unit, one waveform processing channel in a radio unit, or multiple waveform processing channels in a radio unit. Further, one or more of the switches can be connected to no antenna units (in a tree topology), one antenna unit, or multiple antenna units.

One or more of the digital data switches in the present radio system can also be configured to simultaneously receive multiple waveform data signals from a single processing channel. In this case, the data signals can be routed only to an antenna unit that is able to process the multiple waveform data (e.g., a multiband AU). That is because the switches, which are protocol agnostic, cannot split the data signals coming from one channel and send the split data signals to two separate antenna units.

Figure 3:
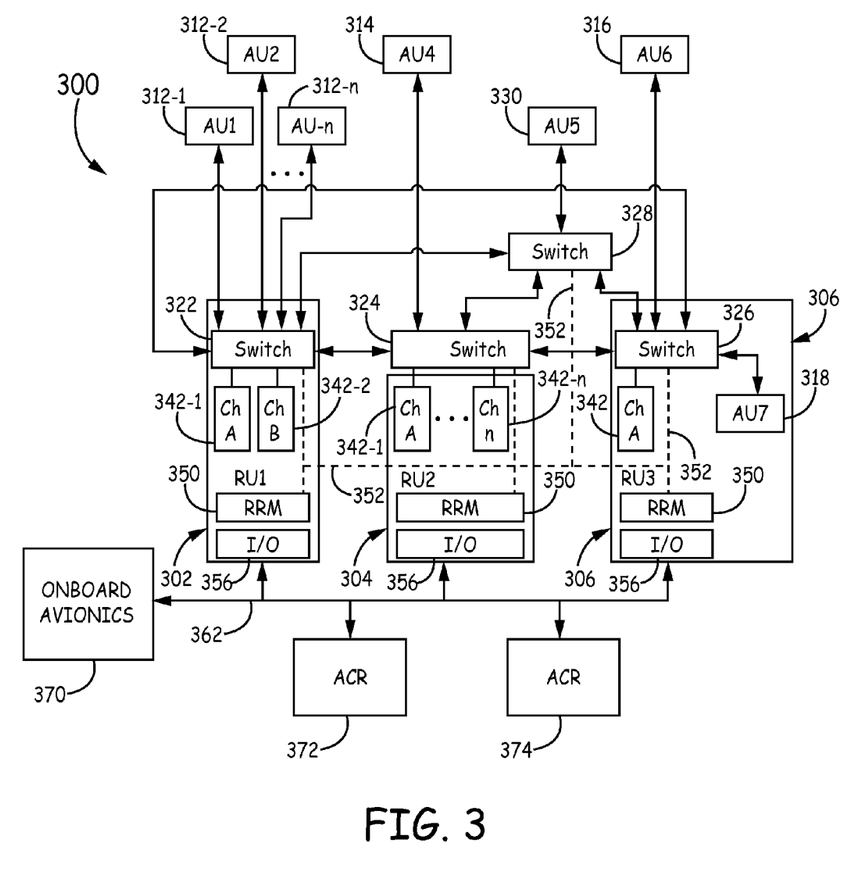
FIG. 3 is a block diagram of an interconnection fabric architecture for a flexible avionics radio system according to a further embodiment.

FIG. 3 illustrates an interconnection fabric architecture for a flexible avionics radio system 300 according to another embodiment. The radio system 300 generally includes a plurality of software defined radio units, which are interconnected with a plurality of antenna units through a set of protocol agnostic digital data switches. The radio system 300 is configurable to process radio signals in accordance with different communication protocols, such as one or more of VDL, HFDL, or Satcom protocols, as well as future protocols such AeroMACS.

As shown in FIG. 3, radio system 300 includes a first radio unit 302 (RU1) that is operatively coupled to an antenna unit 312-1 (AU1) and an antenna unit 312-2 (AU2) through a digital data switch 322 located in radio unit 302. The radio unit 302 can also be operatively coupled to one or more additional antenna units 312-n (AU-n) through switch 322. A second radio unit 304 (RU2) is operatively coupled to an antenna unit 314 (AU4) through a digital data switch 324 that is external to radio unit 304. A third radio unit 306 (RU3) is operatively coupled to an antenna unit 316 (AU6) through a digital data switch 326 located in radio unit 306. An antenna unit 318 (AU7), integrated within radio unit 306, is operatively connected to switch 326.

In addition, a standalone digital data switch 328, which is external to the radio units, is operatively connected to switches 322, 324, and 326. The switch 328 is also operatively connected to an antenna unit 330 (AU5). The switches 322, 324, 326, and 328 are in bidirectional communication with each other, such as through data lines comprising metal wiring or fiber optic cables.

The switch 322 is connected to a first waveform processing channel block 342-1 (Ch A) and a second waveform processing channel block 342-2 (Ch B) in radio unit 302. The switch 322 establishes a data connection between channel block 342-1 (or channel block 342-2) and antenna units 312-1, 312-2, or 312-n. The switch 324 is connected to a first waveform processing channel block 342-1 (Ch A) and one or more additional waveform processing channel blocks 342-n (Ch n) in radio unit 304. The switch 324 establishes a data connection between channel block 342-1 (or one or more of channel blocks 342-n) and antenna unit 314. The switch 326 is connected to a single waveform processing channel block 342 (Ch A) in radio unit 306. The switch 326 establishes a data connection between channel block 342 and antenna unit 316 or antenna unit 318.

The radio system 300 also includes a set of radio resources managers (RRMs) 350, which are located in each of the radio units. The RRMs 350 each include a processing device configured to control the operation of the switches through control lines 352. The configuration of the switches is done through a dedicated control interface provided by RRMs 350. For example, switch control information can be sent to any of switches 322, 324, 326, and 328 by any of RRMs 350.

Each of the switches can be redundantly controlled by RRMs 350 to avoid a single point of failure of radio system 300. For example, the switches can be configured to support a failure-tolerant multi-master control scheme that provides a voting mechanism that is activated when one of the RRMs has corrupted or missing control information.

Each of the radio units in radio system 300 communicate with an avionics bus 362 through an I/O interface 356 in each radio unit. The avionics bus 362 provides a data communication pathway between the radio units and various onboard avionics devices 370. The avionics bus 362 is also in communication with other aircraft systems, via a first ACR 372 and a second ACR 374.

The bidirectional communication between the switches in radio system 300 allows data from one or more of the antenna units or one or more of the radio units to be rerouted through the switches in a similar fashion as discussed above for radio system 100.

A computer or processor used in the present system and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include volatile or non-volatile media such as Random Access Memory (RAM), Read Only Memory (ROM), Electrically Erasable Programmable ROM (EEPROM), flash memory, and the like, or any other media that can be used to carry or store desired program code in the form of computer executable instructions or data structures.

Example Embodiments

Example 1 includes a radio system comprising: a plurality of software defined radio units; a plurality of digital data switches each in operative communication with at least one of the radio units, the digital data switches operatively connected to each other; a plurality of antenna units each in operative communication with at least one of the radio units through at least one of the digital data switches; and a plurality of radio resources managers each operatively coupled to one or more of the digital data switches, each of the radio resources managers configured to control one or more of the digital data switches to route digital data between the radio units and the antenna units.

Example 2 includes the system of Example 1, wherein the digital data switches are respectively located in each of the radio units.

Example 3 includes the system of Example 1, wherein one or more of the digital data switches are located external to one or more of the radio units.

Example 4 includes the system of any of Examples 1-3, wherein the radio resources managers are respectively located in each of the radio units.

Example 5 includes the system of any of Examples 1-3, wherein one or more of the radio resources managers are located external to one or more of the radio units.

Example 6 includes the system of any of Examples 1-5, wherein the digital data switches are protocol agnostic switches.

Example 7 includes the system of any of Examples 1-6, wherein the digital data switches comprise electrical switches or optical switches.

Example 8 includes the system of any of Examples 1-7, wherein the digital data switches comprise field programmable gate arrays.

Example 9 includes the system of any of Examples 1-7, wherein the digital data switches comprise micro-electrical-mechanical systems (MEMS) optical switches.

Example 10 includes the system of any of Examples 1 and 3-9, wherein at least one of the digital data switches is external to all of the radio units, and communicates with all of the radio units through the other digital data switches.

Example 11 includes the system of any of Examples 1-10, wherein the digital data switches are each respectively connected to one or more waveform processing channels in each of the radio units.

Example 12 includes the system of Example 11, wherein the one or more waveform processing channels are each configured to provide a single avionics waveform, or multiple avionics waveforms.

Example 13 includes the system of any of Examples 1-12, wherein the digital data switches are operatively connected to each other through data lines comprising metal wiring or fiber optic cables.

Example 14 includes the system of any of Examples 1-13, wherein each of the digital data switches is configured to receive control information from all of the radio resources managers.

Example 15 includes the system of Example 14, wherein the digital data switches support a failure-tolerant multi-master control scheme that provides a voting or other redundancy management mechanism that is activated when one of the radio resources managers has corrupted or missing control information.

Example 16 includes the system of any of Examples 11-12, wherein at least one of the digital data switches is configured to simultaneously receive multiple waveform data signals from at least one of the waveform processing channels.

Example 17 includes the system of Example 16, wherein at least one of the antenna units is configured to process the multiple waveform data signals.

Example 18 includes a radio system comprising: a first software defined radio unit including one or more waveform processing channels; a first digital data switch operatively coupled to the one or more waveform processing channels in the first software defined radio unit; at least one antenna unit operatively coupled to the first digital data switch; one or more additional software defined radio units each including one or more waveform processing channels; one or more additional digital data switches operatively coupled to the one or more waveform processing channels in the one or more additional software defined radio units; one or more additional antenna units operatively coupled the one or more additional digital data switches; a first radio resources manager operatively coupled to the first digital data switch, and the one or more additional digital data switches; and one or more additional radio resources managers operatively coupled to the one or more additional digital data switches, and the first digital data switch; wherein the digital data switches are operatively connected to each other, and are controllable by any of the radio resources managers to route digital data between the software defined radio units and the antenna units.

Example 19 includes the system of Example 18, wherein the first digital data switch is located in the first software defined radio unit, and at least one of the additional digital data switches is located in at least one of the additional software defined radio units.

Example 20 includes the system of Example 18, wherein the first digital data switch is located external to the first software defined radio unit, and at least one of the additional digital data switches is located external to at least one of the additional software defined radio units.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A radio system comprising:
a plurality of software defined radio units;
a plurality of digital data switches each in operative communication with at least one of the radio units, the digital data switches operatively connected to each other;
a plurality of antenna units each in operative communication with at least one of the radio units through at least one of the digital data switches; and
a plurality of radio resources managers each operatively coupled to one or more of the digital data switches, each of the radio resources managers configured to control one or more of the digital data switches to route digital data between the radio units and the antenna units;
wherein each of the digital data switches is configured to receive control information from each of the radio resources managers;
wherein the digital data switches support a failure-tolerant multi-master control scheme that provides a voting or other redundancy management mechanism that is activated when one of the radio resources managers has corrupted or missing control information.

2. The system of claim 1, wherein the digital data switches are respectively located in each of the radio units.

3. The system of claim 1, wherein one or more of the digital data switches are located external to one or more of the radio units.

4. The system of claim 1, wherein the radio resources managers are respectively located in each of the radio units.

5. The system of claim 1, wherein one or more of the radio resources managers are located external to one or more of the radio units.

6. The system of claim 1, wherein the digital data switches are protocol agnostic switches in which switching is controllable independently of the actual digital data and protocol being transferred in the radio system.

7. The system of claim 1, wherein the digital data switches comprise electrical switches or optical switches.

8. The system of claim 1, wherein the digital data switches comprise field programmable gate arrays.

9. The system of claim 1, wherein the digital data switches comprise micro-electrical-mechanical systems (MEMS) optical switches.

10. The system of claim 1, wherein at least one of the digital data switches is external to all of the radio units, and communicates with all of the radio units through the other digital data switches.

11. The system of claim 1, wherein the digital data switches are each respectively connected to one or more waveform processing channels in each of the radio units.

12. The system of claim 11, wherein the one or more waveform processing channels are each configured to provide a single avionics waveform, or multiple avionics waveforms.

13. The system of claim 1, wherein the digital data switches are operatively connected to each other through data lines comprising metal wiring or fiber optic cables.

14. The system of claim 11, wherein at least one of the digital data switches is configured to simultaneously receive multiple waveform data signals from at least one of the waveform processing channels.

15. The system of claim 14, wherein at least one of the antenna units is configured to process the multiple waveform data signals.

* * * * *